US009342360B2

(12) United States Patent
Bacher et al.

(10) Patent No.: US 9,342,360 B2
(45) Date of Patent: May 17, 2016

(54) WORKLOAD MIGRATION BETWEEN VIRTUALIZATION SOFTWARES

(71) Applicant: INTERNATIONAL BUSINESS MACHINES CORPORATION, Armonk, NY (US)

(72) Inventors: Utz Bacher, Weil im Schoenbuch (DE); Reinhard Buendgen, Tuebingen (DE); Einar Lueck, Stuttgart (DE); Angel Nunez Mencias, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/702,179

(22) Filed: May 1, 2015

(65) Prior Publication Data
US 2015/0234684 A1 Aug. 20, 2015

Related U.S. Application Data

(63) Continuation of application No. 14/090,014, filed on Nov. 26, 2013, now Pat. No. 9,043,493.

(30) Foreign Application Priority Data

Nov. 27, 2012 (GB) .................................. 1221265.0

(51) Int. Cl.
*G06F 3/06* (2006.01)
*G06F 9/50* (2006.01)
(Continued)

(52) U.S. Cl.
CPC .......... *G06F 9/5016* (2013.01); *G06F 9/45533* (2013.01); *G06F 9/467* (2013.01); *G06F 2009/4557* (2013.01); *G06F 2209/5018* (2013.01)

(58) Field of Classification Search
None
See application file for complete search history.

(56) References Cited

U.S. PATENT DOCUMENTS 7,814,495 B1 10/2010 Lim et al.
2010/0318608 A1 * 12/2010 Huang .................. G06F 9/4856
709/205

(Continued)

FOREIGN PATENT DOCUMENTS

EP 1962192 A1 8/2008
EP 2315119 A1 4/2011

OTHER PUBLICATIONS

Office Action in U.S. Appl. No. 13/874,066, dated May 5, 2015, pp. 1-14.

(Continued)

*Primary Examiner* — Scott Sun
(74) *Attorney, Agent, or Firm* — William A. Kinnaman, Jr., Esq.; Matthew M. Hulihan, Esq.; Heslin Rothenberg Farley & Mesiti P.C.

(57) ABSTRACT

A virtual machine (VM) migration from a source virtual machine monitor (VMM) to a destination VMM on a computer system. Each of the VMMs includes virtualization software, and one or more VMs are executed in each of the VMMs. The virtualization software allocates hardware resources in a form of virtual resources for the concurrent execution of one or more VMs and the virtualization software. A portion of a memory of the hardware resources includes hardware memory segments. A first portion of the memory segments is assigned to a source logical partition and a second portion is assigned to a destination logical partition. The source VMM operates in the source logical partition and the destination VMM operates in the destination logical partition. The first portion of the memory segments is mapped into a source VMM memory, and the second portion of the memory segments is mapped into a destination VMM memory.

20 Claims, 3 Drawing Sheets (51) Int. Cl.
*G06F 9/46* (2006.01)
*G06F 9/455* (2006.01)
*G06F 13/38* (2006.01)

(56) References Cited

U.S. PATENT DOCUMENTS

| | | |
|---|---|---|
| 2011/0023030 A1 | 1/2011 | Lim et al. |
| 2011/0258701 A1 | 10/2011 | Cruz et al. |
| 2012/0017031 A1 | 1/2012 | Mashtizadeh et al. |
| 2012/0102258 A1 | 4/2012 | Hepkin et al. |
| 2012/0117562 A1 | 5/2012 | Jess et al. |
| 2012/0192182 A1 | 7/2012 | Hayward et al. |
| 2012/0254865 A1 | 10/2012 | Saeki et al. |

OTHER PUBLICATIONS

IBM, "Instantaneous Virtual Machine Live Migration on a Partitioned Scaled System," IPCOM000184453D, Jun. 2009, p. 1.

IBM, "Method for Providing a Fast Dump and Restart Algorithm for an Operating System Running in a Logical Partition," IPCOM000186081D, Jun. 2009, pp. 1-2.

Bacher, Utz, et al., "Concurrent Hypervisor Replacement," U.S. Appl. No. 13/874,066, filed Apr. 30, 2013, pp. 1-29.

Combined Search and Examination Report for GB1319575.5, dated Apr. 9, 2014, pp. 1-5.

\* cited by examiner

WORKLOAD MIGRATION BETWEEN VIRTUALIZATION SOFTWARES

CROSS REFERENCE TO RELATED APPLICATIONS

This application is a continuation of U.S. patent application Ser. No. 14/090,014 filed Nov. 26, 2013 entitled, "WORKLOAD MIGRATION BETWEEN VIRTUALIZATION SOFTWARES", which claims priority from United Kingdom patent application number 1221265.0, filed Nov. 27, 2012, which is hereby incorporated herein by reference in its entirety.

BACKGROUND

As it is well known in the field of computer science, a virtual machine monitor (VMM) which may be alternatively named as a "hypervisor" or a "virtualization kernel," is a virtualization software that is logically interposed and interfacing between hardware resources of a computer system and one or more virtual machines VMs executed in the VMM. A virtual machine (VM) which may be alternatively named as a "guest," is a software abstraction or in other words virtualization of an actual computer system, that can be operated under an operating system like Windows, Unix, Linux, etc. and can support applications running on the operating system. The VMM allocates hardware devices or portions of hardware devices of the computer system like CPUs, hard drives, I/O ports, memory, etc. to the VMs in a form of so called virtual resources. For instance VMM can map hardware disks to virtual disks used for operation of the VMs.

Virtualization architecture of the hardware resources can consist of one or more virtualization layers or levels. For instance, a Linux guest running in the z/VM hypervisor developed by IBM which runs in a PR/SM partition of an IBM System z server is an example of a setup with two layers of virtualization. In general, the virtualization architecture can be quite complex and comprise a lot of virtualization layers.

BRIEF SUMMARY

This complex virtualization architecture clearly demands a method for managing the virtualization software and/or workload of the virtualization software with minimum impact on a performance of other virtualization softwares operating on the same computer. One of the examples of virtualization software management is a Linux suspend/resume procedure enabling migration of the VM from a source VMM to a destination VMM by suspending the VM in the source VMM, saving contents of a VM memory and other information needed for resuming the VM in the target VMM on an external memory device like a disk, and resuming the VM in the target VMM using data stored on the disk.

One or more aspects of the present invention provide for embodiments that fill the need of effective workload management of virtualization softwares. It should be appreciated that aspects of the present invention can be implemented in numerous ways, including as a method, an apparatus, a system, a computer code, one or more non-transitory machine readable media embodying computer instructions causing a computer to perform a method, or a device. Several embodiments are described below.

One embodiment provides a method for a virtual VM migration from a VMM to a destination VMM on a computer system. Each of the VMMs comprises virtualization software that is logically interposed and interfacing between hardware resources of the computer system and one or more VMs being executed in each of the VMMs. The virtualization software is operable to a concurrent execution of the virtualization software and one or more VMs. The virtualization software allocates the hardware resources in a form of virtual resources for the concurrent execution of one or more VMs and the virtualization software. A portion of the hardware resources includes hardware memory segments. A first portion of the hardware memory segments is assigned to a source logical partition and a second portion of the hardware memory segments is assigned to a destination logical partition. The source VMM operates in the source logical partition and the destination VMM operates in the destination logical partition. The first portion of the hardware memory segments is mapped into a source VMM memory and the second portion of the hardware memory segments is mapped into a destination VMM memory.

The method of the embodiment comprises the following steps. The VM is being executed in the source VMM. Each of the hardware memory segments of a plurality of the hardware memory segments assigned to the source logical partition is allocated for an exclusive data storage of VM data being used for an execution of the VM and data used for the execution of the VM is stored in the plurality of the hardware memory segments. The execution of the VM is suspended while VM virtual resources used for the execution of the VM remain allocated for the execution of the VM. The VM extended configuration information to be used for resuming the VM in the destination VMM is transferred from the source VMM to the destination VMM, wherein the VM extended configuration information comprises a list of descriptions of the hardware memory segments of the plurality of the hardware memory segments. Each of the hardware memory segments of the plurality of the hardware memory segments is reassigned from the source logical partition to the destination logical partition, wherein contents of the plurality of the hardware memory segments are kept intact. The VM is exited in the source VMM. The VM is created in the destination VMM according to the VM extended configuration information. The VM is resumed in the destination VMM.

BRIEF DESCRIPTION OF THE SEVERAL VIEWS OF THE DRAWINGS

In the following, embodiments of the invention will be described in greater detail by way of example making reference to the drawings in which.

DETAILED DESCRIPTION

Several exemplary embodiments for a method, a system, and one or more machine readable storage media embodying computer instructions causing a computer to perform the method for a VM migration from a source VMM to a destination VMM on a computer system will now be discussed. It will be apparent to those skilled in the art that aspects of the present invention may be practiced without some or all specific details set forth therein.

As described above the VM migration from the source VMM to the destination VMM is characterized by utilization of the external storage disk for storage of the contents of the VM memory and other information needed for resuming the VM in the destination VMM. This approach has a clear disadvantage of doubling the VM memory content by copying it to the external storage disk. Further this approach may slow down an operation of the computer system because copying the VM memory content might require networking of a very big volume of data. Another problem of this approach might be a lack of confidentiality because copying the content of the VM memory to an external storage disk makes it exposed to any third party.

One or more aspects of the present invention provide a solution that is free of all aforementioned disadvantages. It is based on a "suspend/resume in place" approach. There is no need for copying the contents of the VM to the external storage disk because hardware memory segments containing the contents of the VM memory follow the migration of the VM from the source VMM to the destination VMM.

Figure 1:
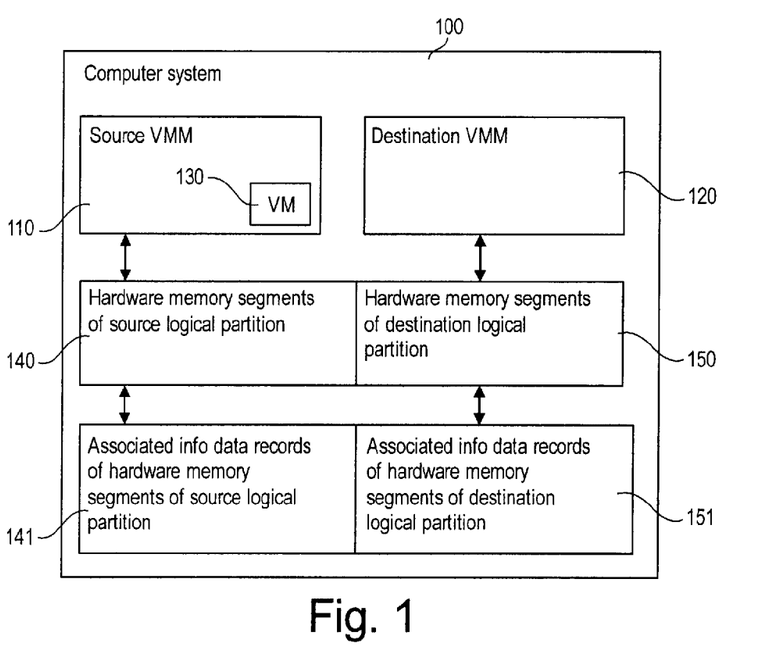
FIG. 1 illustrates a block diagram of a computer system representing an initial stage of a VM migration process from a source VMM to a destination VMM, in accordance with an embodiment of the present invention.
Figure 2:
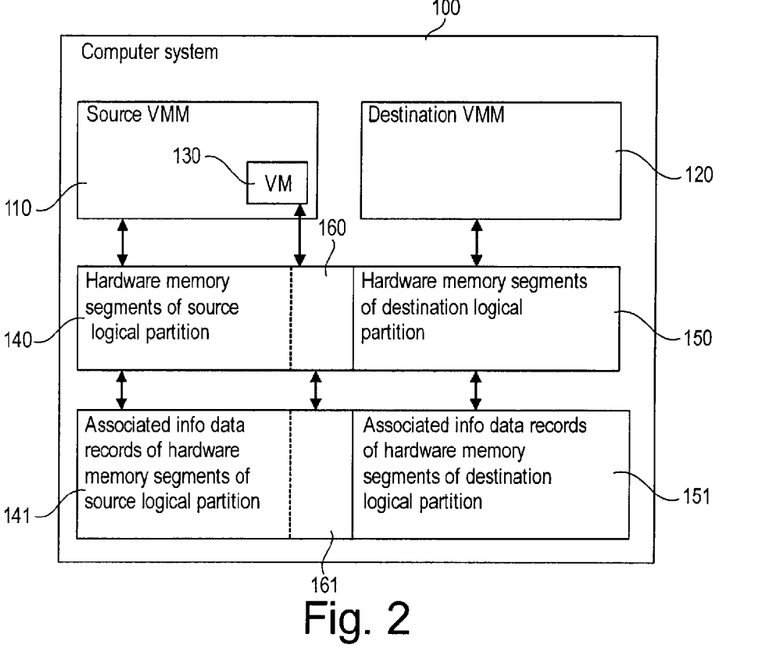
FIG. 2 illustrates a block diagram of a computer system representing a step of allocation of a plurality of hardware memory segments for an exclusive data storage of VM data, in accordance with an embodiment of the present invention.
Figure 3:
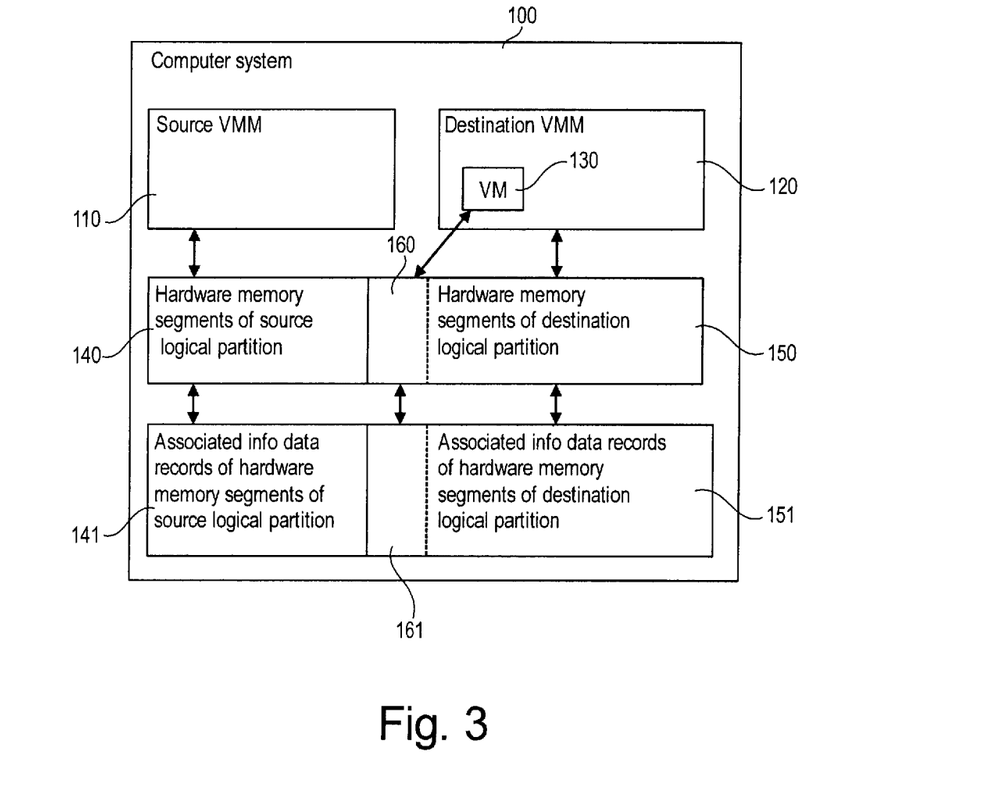
FIG. 3 illustrates a block diagram of a computer system representing a final stage of the VM migration process, in accordance with an embodiment of the present invention.

One or more stages of one embodiment are illustrated on FIGS. 1, 2, and 3.

An initial stage of a VM migration process from a source VMM 110 to a destination VMM 120 is illustrated in FIG. 1 and can be described as follows. Each of the VMMs comprises a virtualization software that is logically interposed and interfacing between hardware resources of the computer system 100 and one or more VMs being executed in each of the VMMs. The virtualization software is operable to a concurrent execution of the virtualization software and one or more VMs. The virtualization software allocates the hardware resources in a form of virtual resources for the concurrent execution of one or more VMs and the virtualization software. A portion of the hardware resources consists of hardware memory segments. A first portion of the hardware memory segments 140 is assigned to a source logical partition and a second portion of the hardware memory segments 150 is assigned to a destination logical partition. The source VMM operates in the source logical partition and the destination VMM operates in the destination logical partition. The first portion of the hardware memory segments 140 is mapped into a source VMM memory and the second portion of the hardware memory segments 150 is mapped into a destination VMM memory. Each hardware memory segment has an associated respective unique info (information) data record. The first portion of the hardware memory segments 140 has associated respective unique info data records 141 of hardware memory segments of the source logical partition and the second portion of the hardware memory segments 150 has the associated respective unique info data records 151 of hardware memory segments of the destination logical partition.

FIG. 2 illustrates a step executed in order to prepare the VM for migration. Each of the hardware memory segments of a plurality of the hardware memory segments 160 assigned to the source logical partition is allocated for an exclusive data storage of VM data being used for an execution of the VM and, in one embodiment, all data used for the execution of the VM is stored in the plurality of the hardware memory segments. The plurality of the hardware memory segments has the associated respective unique info data records 161.

FIG. 3 illustrates a final stage of the VM migration process. The VM is migrated from the source VMM 110 to the destination VMM 120. The plurality of the hardware memory segments 160 containing the VM data and the associated respective unique info data records 161 of the plurality of the hardware memory segments are reassigned from the source logical partition to the destination logical partition, wherein contents of the plurality of the hardware memory segments 160 remain intact during reassignment from the source logical partition to the destination logical partition.

Figure 4:
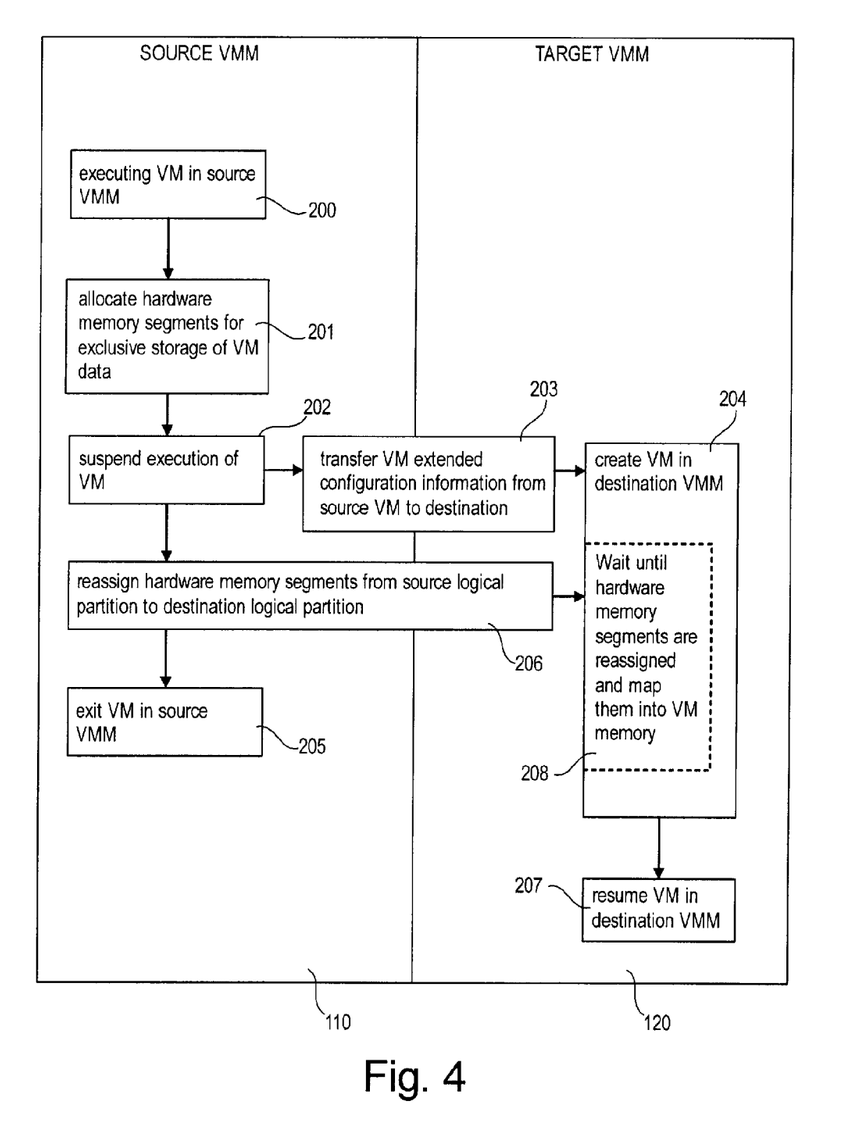
FIG. 4 is a flow chart of operations for the VM migration, in accordance with an embodiment of the present invention.

FIG. 4 is a flow chart of operations 200-207 for the VM migration from the source VMM 110 to the target VMM 120. The operations 200-202 and 205 are executed only in the source VMM and the operations 204, 207 are executed only in the target VMM, therefore corresponding representative boxes of operations 200-202, 204, 205, and 207 are depicted in the source VMM 110 or the target VMM 120 areas in FIG. 4. The operations 203 and 206 are started in the source VMM and executed in both VMMs, therefore the corresponding representative boxes of operations 203 and 206 are depicted in the source VMM 110 and the target VMM 120 areas.

An operation 200 in FIG. 4 represents an initial stage of the VM migration process as illustrated in FIG. 1. The VM 130 is being executed in the source VMM 110.

An operation 201 in FIG. 4 represents the preparation step of the VM migration process as illustrated in FIG. 2. Each of the hardware memory segments of the plurality of hardware memory segments 160 assigned to the source logical partition is allocated for the exclusive data storage of VM data being used for an execution of the VM and all data used for the execution of the VM is stored in the plurality of the hardware memory segments. Each of the hardware memory segments of the plurality of the hardware segments is mapped into a VM memory under a unique respective mapping address.

In another embodiment the operation 201 further comprises an assignment of a VM unique identification to the VM.

Yet another embodiment starts with creation of the VM having the plurality of hardware memory segments 160 allocated for the exclusive data storage of the VM data, wherein all data used for the execution of the VM is stored in the plurality of the hardware memory segments and the plurality of the hardware memory segments 160 is assigned to the source logical partition. In this case step 201 is obsolete and the embodiment comprises all steps of the earlier described embodiment (FIG. 4) except step 201. The steps of the embodiment are executed in the same sequence as the steps of the earlier embodiment with one exception, wherein a step 202 is executed after the step 200. The step 200 of the embodiment comprises the assignment of the VM unique identification to the VM.

An operation 202 in FIG. 4 represents suspending of the execution of the VM in the source VMM, wherein the execution of the VM is halted and a VM extended configuration information needed for resuming the VM in the destination VMM is collected, while VM virtual resources used for the execution of the VM remain allocated for the VM. The VM extended configuration information comprises a list of descriptions of the hardware memory segments of the plurality of hardware segments used for the storage of the VM data. The VM extended configuration information can further comprise the VM unique identification assigned to the VM, a VM configuration, and a VM state, wherein the VM configuration comprises a resources list of descriptions of the VM virtual resources and the VM state comprises states of the VM virtual resources excluding the contents of the plurality of the hardware memory segments.

An operation 203 is started after the operation 202. The operation 203 comprises transferring the VM extended configuration information needed for resuming the VM in the destination VMM from the source VMM to the destination VMM, wherein transferring the VM extended configuration information can be done by communicating through standard networking.

Yet another operation 206 is started after operation 202 and executed independently of operation 203. The operation 206 comprises reassigning each of the hardware memory segments of the plurality of the hardware memory segments from the source logical partition to the destination logical partition, wherein contents of the plurality of the hardware memory segments 160 remain intact.

Completion of the operations 203 and 206 provide input for an operation 204, wherein the process of VM creation in the destination VMM is started upon the completion of the operation 203. The VM creation is carried out in the destination VMM according to the VM extended configuration information. A sub-step 208 of the operation 204 waits until the operation 206 is completed and provides mapping of hardware memory segments containing the VM data into the VM memory under the unique respective mapping addresses, e.g. under the same mapping addresses as they were mapped in the VM memory when the VM was executed in the source VMM. States are assigned to the VM virtual resources allocated for the execution of the VM according to the VM state.

An operation 205 is started after the operation 206. The VM is exited in the source VMM and the VM virtual resources are freed.

An operation 207 is started after the operation 204. The VM is resumed in the destination VMM.

The associated respective unique info data records can be used for integrity of reassignment of the hardware memory segments.

The associated respective unique info data record can comprise a partition unique identification assigned to the destination logical partition. A firmware after receiving a request to reassign the hardware memory segment from the source logical partition to the destination logical partition can check whether the partition unique identification number of the destination logical partition stored in the associated respective unique info data record of the hardware memory segment is an admissible target for reassignment. If yes, the firmware reassigns the hardware memory segment from the source logical partition to the destination logical partition. Otherwise, the firmware returns an error code.

The associated respective unique info data record can further comprise a VM unique identification assigned to the VM. After reassignment of the hardware memory segment from the source logical partition to the destination logical partition the destination VMM can check whether the associated respective unique info data record of the hardware memory segment contains the VM unique identification. If yes, the destination VMM maps the hardware memory segment into the destination VMM memory as allocated for the exclusive data storage of the VM data. Otherwise, the destination VMM maps the hardware memory segment into the destination VMM memory as allocated for use in a generic memory pool.

The associated respective unique info data record can be used for storage of the unique respective mapping address of the hardware memory segment during the VM migration. The unique respective mapping address of the hardware memory segment of the plurality of the hardware memory segments can be stored in the associated respective unique info data record during the execution of the VM in the source VMM. Afterwards the unique respective mapping address of the hardware memory segment of the plurality of the hardware memory segments stored in the respective unique info data record can be used for mapping of the hardware memory segment into the VM memory during creation of the VM in the destination VMM.

Yet another embodiment provides an implementation example of the invention. The implementation example comprises the following process parts: preparation of a VM for migration, migration of the VM, termination of the VM. The process parts are executed on a computer system. The computer system and these process parts are described below.

The computer system supports a first layer of virtualization which splits the computer system into logical partitions (further denoted as LPARs). The PR/SM partitions of the IBM System z architecture are an example of LPARs of a system with such a first layer of virtualization. A source VMM and a destination VMM operate in two different LPARs of the computer system. Each of the VMMs comprises a virtualization software that is logically interposed and interfacing between hardware resources of the computer system and one or more VMs being executed in each of the VMMs. The virtualization software is operable to a concurrent execution of the virtualization software and one or more VMs. The virtualization software allocates the hardware resources in a form of virtual resources for the concurrent execution of one or more VMs and the virtualization software. A portion of the hardware resources consists of hardware memory segments (further denoted as HWm-segs). The first portion of the HWm-segs is assigned to a source LPAR and a second portion of the HWm-segs is assigned to a destination LPAR. The source VMM operates in the source LPAR and the destination VMM operates in the destination LPAR. The first portion is mapped into a source VMM memory and the second portion is mapped into a destination VMM memory. Each of the HWm-segs has an associated respective unique info data record (further denoted as ResInfo). A guest manager (GM) is operable for configuring, starting, creating, exiting, and executing under its control of one of the VMs. For instance, a quick emulator (QEMU) is an example of such a GM in a Linux kernel based virtual machine (Linux/kvm). A source GM is operable for configuring the VM, creating the VM, starting the VM, exiting the VM, and executing the VM under its control on the source LPAR. A destination GM is operable for configuring the VM, creating the VM, starting the VM, exiting the VM, and executing the VM under its control on the source LPAR. The source GM is a part of the source VMM and the destination GM is a part of the destination VMM. A migration of the VM from the source VMM to the destination VMM is controlled by a migration controller (MC). The MC is a management software operable for providing a user interface for managing the migration of the VM from one VMM to another VMM. The MC is further operable for communication with the GMs.

Preparation of the VM for migration comprises the following operations: starting the source GM on the source LPAR, creation of the VM, allocation of memory for the VM, mapping the allocated memory in the source GM, and executing the VM in the allocated memory under control of the source GM using the allocated and mapped HWm-segs.

The operation of VM creation may comprise the following: a configuration information of the VM to be created is provided to the source GM, the source GM creates the VM according to the configuration information, wherein the configuration information comprises a resources list of descriptions of the VM virtual resources, a VM unique identification of the VM to be created and an indication that the VM memory is to be allocated in a way that it supports the migration of the VM.

The operation of allocation of the memory for the VM may comprise the following: the source GM sends a request to the source VMM to allocate the HWm-segs for the exclusive data storage of VM data used for an execution of the VM, the request of the GM further comprises a specified amount of memory used for the execution of the VM, wherein all VM data used for the execution of the VM is stored in the allocated HWm-segs, (for instance, in a Linux or Unix system a mmap system call can be extended to pass this request to the VMM), after receiving this request the source VMM allocates free HWm-segs for the exclusive storage of the VM data, wherein the free HWm-segs are the HWm-segs that are not tagged for exclusive storage of any other software operating in the source LPAR, wherein the allocated HWm-segs are tagged for the exclusive storage of the VM data by associating the allocated HWm-segs with the VM unique identification which is stored in the ResInfos of the allocated HWM-seq.

The operation of mapping of the allocated memory into the source GM may comprise the following: the VMM maps the memory of the allocated HWm-segs as anonymous memory into an address space of the source GM, wherein the allocated HWm-segs carry contents of a VM's main memory, the mapping is done using a deterministic policy (e.g. a linear mapping), and the mapping information is stored in the ResInfo.

The operations of allocation of the memory for the VM and of mapping of the allocated memory on the source GM are another embodiment of the operation 201 (FIG. 4).

Migration of the VM comprises the following operations, in one embodiment: starting the destination VMM on the destination LPAR (if the destination VMM is not yet started on the destination LPAR), initiation of the migration of the VM, suspending in place the VM, starting of the destination GM in the destination VMM, transferring the VM extended configuration information, transferring the VM memory, exiting the VM in the source VMM, creation of the VM in the destination VMM, and reassignment of the allocated HWm-segs.

The operation of starting the destination VMM on the destination LPAR may comprise the following: the MC starts the destination VMM on the destination LPAR.

The operation of initiation of the migration of the VM may comprise the following: the MC initiates the migration of the VM by sending an order to the source GM to migrate the VM to the destination VMM.

The operation of suspending of the VM in place may comprise the following: the source GM suspends the VM in place, wherein the execution of the VM is halted, the VM virtual resources used for the execution of the VM remain allocated for the execution of the VM and the VM still resides in the allocated HWm-segs, a VM extended configuration information is collected, wherein the VM extended configuration information comprises the following: the amount of memory used for the execution of the VM, the VM unique identification, a VM state, and the resources list of descriptions of the VM virtual resources, wherein the VM state comprises states of the VM virtual resources excluding contents of the allocated HWm-segs. The operation of suspending of the VM in place is another embodiment of the operation 202 (FIG. 4).

The operation of starting the destination GM in the destination VMM may comprise the following: the MC or the source GM starts the destination GM in the destination VMM and the destination GM waits for the VM to be transferred.

The operation of transferring the VM extended configuration may comprise the following: the source GM transfers the VM extended configuration information to the destination GM (e.g. through a standard networking), the source GM sends a request to the destination GM to create and resume the VM according to the VM extended configuration information. The operation of transferring the VM extended configuration information is another embodiment of the operation 203 (FIG. 4).

The operation of transferring the VM memory may comprise the following: the source GM sends a request (e.g. a new system call) to the source VMM to transfer the allocated HWM-segs from the source VMM to the destination VMM.

The operation of exiting the VM in the source VMM may comprise the following: the source GM terminates execution of the VM and frees the VM virtual resources. The operation of exiting the VM in the source VMM is another embodiment of the operation 205.

The operation of creation of the VM in the destination VMM may comprise the following: the VM is created in the destination VMM according to the transferred VM extended configuration information, the destination GM submits a request (e.g. a variant of the mmap system call) to the destination VMM to map the allocated HWM-segs tagged with the VM unique identification into the memory of the VM, this request will be blocked until until the HWm-segs with the specified ResInfo are available to the destination VMM and the destination VMM can fulfill the request.

The operation of reassignment of the allocated HWm-segs may comprise the following: the source VMM issues a request to the FW of the computer system to reassign all allocated HWm-segs which are tagged with the VM unique identification in the ResInfos from the source LPAR to the destination LPAR.

The operations of transferring the VM memory, creation of the VM in the destination LPAR, and reassignment of the allocated HWm-segs is another embodiment of the operations 206, 204, and 207 (FIG. 4).

The operation of reassignment of the allocated HWm-segs may comprise further the following operations: memory hot-unplugging on the source LPAR, memory hot-plugging on the destination LPAR, receiving memory by the destination GM, and resuming execution of the VM in the destination VMM.

The operation of memory hot-unplugging on the source LPAR may comprise the following: the source VMM receives a signal that all HWm-segs allocated for the VM are removed from the destination LPAR and afterwards memory management of the source VMM updates its structures accordingly.

The operation of memory hot-plugging on the destination LPAR may comprise the following: the destination VMM receives a signal that the allocated HWm-segs are added, afterwards the destination VMM checks for allocation status of allocated HWm-segs, after confirmation that the new HWm-segs are allocated any pending and/or blocking memory map calls to the allocated HWm-segs are performed.

The operation of receiving memory by the destination GM may comprise the following: the mmap call will return and the destination GM gets the allocated HWm-segs mapped into its address space, and the allocated HWm-segs carry the contents of the VM memory.

The operation of resuming execution of the VM in the destination VMM may comprise the following: the destination GM resumes execution of the VM in the destination VMM.

Termination of the VM in the destination LPAR comprises the following operations, in one embodiment: halting the execution of the VM, deallocation of the allocated HWm-segs, and exiting of the destination GM.

The operation of halting the execution of the VM may comprise the following: the destination GM terminates the VM, the destination GM frees the VM virtual resources (e.g.

I/O devices, CPUs, memory, etc.), and the allocated HWm-segs are released via un-mapping from the destination GM memory.

The operation of deallocation of the allocated HWm-segs may comprise the following: the allocated HWm-segs are deallocated by the destination GM after halting the execution of the VM, the VMM deletes information related to the VM in the ResInfos of the deallocated HWm-segs (e.g. the VM unique identification can be deleted in the ResInfos of the deallocated HWm-segs), after deletion of the information in the ResInfo related to the VM the deallocated HWm-segs can be used for other softwares again.

The operation of exiting of the destination GM may comprise the following: the destination GM terminates.

As described herein, one embodiment provides a method for a virtual VM migration from a VMM to a destination VMM on a computer system. Each of the VMMs comprises a virtualization software that is logically interposed and interfacing between hardware resources of the computer system and one or more VMs being executed in each of the VMMs. The virtualization software is operable to a concurrent execution of the virtualization software and one or more VMs. The virtualization software allocates the hardware resources in a form of virtual resources for the concurrent execution of one or more VMs and the virtualization software. A portion of the hardware resources consists of hardware memory segments. A first portion of the hardware memory segments is assigned to a source logical partition and a second portion of the hardware memory segments is assigned to a destination logical partition. The source VMM operates in the source logical partition and the destination VMM operates in the destination logical partition. The first portion of the hardware memory segments is mapped into a source VMM memory and the second portion of the hardware memory segments is mapped into a destination VMM memory.

The method of the embodiment comprises the following steps. The VM is being executed in the source VMM. Each of the hardware memory segments of a plurality of the hardware memory segments assigned to the source logical partition is allocated for an exclusive data storage of VM data being used for an execution of the VM and all data used for the execution of the VM is stored in the plurality of the hardware memory segments. The execution of the VM is suspended while VM virtual resources used for the execution of the VM remain allocated for the execution of the VM. The VM extended configuration information needed for resuming the VM in the destination VMM is transferred from the source VMM to the destination VMM, wherein the VM extended configuration information comprises a list of descriptions of the hardware memory segments of the plurality of the hardware memory segments. Each of the hardware memory segments of the plurality of the hardware memory segments is reassigned from the source logical partition to the destination logical partition, wherein contents of the plurality of the hardware memory segments are kept intact. The VM is exited in the source VMM. The VM is created in the destination VMM according to the VM extended configuration information. The VM is resumed in the destination VMM.

Another embodiment provides a computer system comprising hardware memory segments, a source VMM, and a destination VMM.

A first portion of the hardware memory segments is assigned to a source logical partition and a second portion of the hardware memory segments is assigned to a destination logical partition.

Each of the VMMs comprises a virtualization software that is logically interposed and interfacing between hardware resources of the computer system and one or more virtual machines (VMs) being executed in each of the VMMs. The virtualization software is operable to a concurrent execution of the virtualization software and one or more VMs. The virtualization software allocates the hardware resources in a form of virtual resources for the concurrent execution of one or more VMs and the virtualization software. The source VMM operates in the source logical partition and the destination VMM operates in the destination logical partition. The first portion of the hardware memory is mapped into a source VMM memory and the second portion of the hardware memory segments is mapped into a destination VMM memory.

The computer system is operable for: executing a VM in the source VMM; allocating a hardware memory segment for an exclusive data storage of VM data used for an execution of the VM; suspending the execution of the VM while keeping VM virtual resources used for the execution of the VM allocated for the execution of the VM; transferring a VM extended configuration information needed for resuming the VM in the destination VMM from the source VMM to the destination VMM, wherein the VM extended configuration information comprises a list of descriptions of the hardware memory segments allocated for the exclusive data storage of the VM data; reassigning the hardware memory segment from the source logical partition to the destination logical partition, wherein a content of the hardware memory segment remain intact; exiting the VM in the source VMM; creating the VM in the destination VMM, wherein the VM is created according to the VM extended configuration information; resuming the VM in the destination VMM.

Yet another embodiment provides one or more machine readable storage media embodying computer instructions for a virtual VM migration from a VMM to a destination VMM on a computer system. Each of the VMMs comprises a virtualization software that is logically interposed and interfacing between hardware resources of the computer system and one or more VMs being executed in each of the VMMs. The virtualization software is operable to a concurrent execution of the virtualization software and one or more VMs. The virtualization software allocates the hardware resources in a form of virtual resources for the concurrent execution of one or more VMs and the virtualization software. A portion of the hardware resources consists of hardware memory segments. A first portion of the hardware memory segments is assigned to a source logical partition and a second portion of the hardware memory segments is assigned to a destination logical partition. The source VMM operates in the source logical partition and the destination VMM operates in the destination logical partition. The first portion of the hardware memory segments is mapped into a source VMM memory and the second portion of the hardware memory segments is mapped into a destination VMM memory.

The computer instructions cause the computer system to perform a method comprising the following steps. The VM is being executed in the source VMM. Each of the hardware memory segments of a plurality of the hardware memory segments assigned to the source logical partition is allocated for an exclusive data storage of VM data being used for an execution of the VM and all data used for the execution of the VM is stored in the plurality of the hardware memory segments. The execution of the VM is suspended while VM virtual resources used for the execution of the VM remain allocated for the execution of the VM. The VM extended configuration information needed for resuming the VM in the destination VMM is transferred from the source VMM to the destination VMM, wherein the VM extended configuration information comprises a list of descriptions of the hardware memory segments of the plurality of the hardware memory segments. Each of the hardware memory segments of the plurality of the hardware memory segments is reassigned from the source logical partition to the destination logical partition, wherein contents of the plurality of the hardware memory segments are kept intact. The VM is exited in the source VMM. The VM is created in the destination VMM according to the VM extended configuration information. The VM is resumed in the destination VMM.

All aforementioned embodiments can further comprise a portion or all of the following features and/or functionalities: assigning a VM unique identification to the VM; halting the execution of the VM; collecting the VM extended configuration information; communicating through standard networking the VM extended configuration information; the VM extended configuration information comprising the VM unique identification, a VM state, and a resources list of descriptions of the VM virtual resources used for the VM execution; the VM state comprising states of the VM virtual resources after suspending the execution of the VM and excluding the contents of the hardware memory segments allocated for the exclusive data storage of the VM data; assigning a partition unique identification to the destination logical partition; mapping the hardware memory segment into a VM memory under a unique respective mapping address; an associated respective unique info data record being associated with the hardware memory segment; writing the partition unique identification, the VM unique identification, and the unique respective mapping address to the associated respective unique info data record of the hardware memory segment; checking whether the associated respective unique info data record comprises the VM unique identification; mapping the hardware memory segment into the destination VMM memory as allocated for the exclusive data storage of the VM data; assigning states to the VM virtual resources allocated for the execution of the VM according to the VM state.

One implementation enables strict segregation of contents of HWm-segs between LPARs. In particular the destination LPAR cannot access any contents of any HWm-Seg of the source LPAR unless the source LPAR explicitly grants access for the destination LPAR to one of the HWm-seg assigned to the source LPAR. In this case the destination LPAR can access only the HWm-segs that it was granted access to. In another aspect, management of the HWm-seg as well as reassignment of the HWm-segs during the migration is completely transparent to the MC and the GMs.

What is claimed is:

1. A method comprising:
   migrating a virtual machine from a source virtual machine monitor to a destination virtual machine monitor, the migrating comprising:
   obtaining configuration information indicating hardware memory segments mapped to the source virtual machine monitor, the hardware memory segments storing data of the virtual machine; and
   initiating reassignment of the hardware memory segments to map the hardware memory segments to the destination virtual machine monitor, wherein contents of the hardware memory segments remain intact.

2. The method of claim 1, wherein the hardware memory segments are initially assigned to a source logical partition in which the source virtual machine monitor operates, and wherein initiating the reassignment of the hardware memory segments initiates reassignment of the hardware memory segments to a destination logical partition in which the destination virtual machine monitor operates.

3. The method of claim 2, wherein the migrating further comprises:
   prior to initiating the reassignment of the hardware memory segments, marking information data structures associated with the hardware memory segments with destination partition identification information and mapping address information; and
   initiating reassignment of the information data structures from the source logical partition to the destination logical partition.

4. The method of claim 1, wherein the migrating further comprises transferring the configuration information from the source virtual machine monitor to the destination virtual machine monitor to facilitate creation of the virtual machine in the destination virtual machine monitor.

5. The method of claim 4, wherein the migrating further comprises suspending execution of the virtual machine and obtaining the configuration information based on the suspending execution.

6. The method of claim 5, wherein subsequent to the suspending, virtual resources used for execution of the virtual machine initially remain allocated for execution of the virtual machine, and wherein the migrating further comprises:
   exiting the virtual machine in the source virtual machine monitor based on the initiating reassignment of the hardware memory segments; and
   freeing the virtual resources based on the exiting.

7. The method of claim 1, further comprising prior to the initiating reassignment of the hardware memory segments, storing the data of the virtual machine in the hardware memory segments, wherein the stored data of the virtual machine stored in the hardware memory segments comprises all data of the virtual machine stored in a set of all hardware memory segments mapped to the source virtual machine monitor and the hardware memory segments storing the data of the virtual machine contain data of only the virtual machine and no other virtual machines.

8. A computer system configured to perform a method, the method comprising:
   migrating a virtual machine from a source virtual machine monitor to a destination virtual machine monitor, the migrating comprising:
   obtaining configuration information indicating hardware memory segments mapped to the source virtual machine monitor, the hardware memory segments storing data of the virtual machine; and
   initiating reassignment of the hardware memory segments to map the hardware memory segments to the destination virtual machine monitor, wherein contents of the hardware memory segments remain intact.

9. The computer system of claim 8, wherein the hardware memory segments are initially assigned to a source logical partition in which the source virtual machine monitor operates, and wherein initiating the reassignment of the hardware memory segments initiates reassignment of the hardware memory segments to a destination logical partition in which the destination virtual machine monitor operates.

10. The computer system of claim 9, wherein the migrating further comprises:
    prior to initiating the reassignment of the hardware memory segments, marking information data structures associated with the hardware memory segments with destination partition identification information and mapping address information; and initiating reassignment of the information data structures from the source logical partition to the destination logical partition.

11. The computer system of claim 8, wherein the migrating further comprises transferring the configuration information from the source virtual machine monitor to the destination virtual machine monitor to facilitate creation of the virtual machine in the destination virtual machine monitor.

12. The computer system of claim 11, wherein the migrating further comprises suspending execution of the virtual machine and obtaining the configuration information based on the suspending execution.

13. The computer system of claim 12, wherein subsequent to the suspending, virtual resources used for execution of the virtual machine initially remain allocated for execution of the virtual machine, and wherein the migrating further comprises:
   exiting the virtual machine in the source virtual machine monitor based on the initiating reassignment of the hardware memory segments; and
   freeing the virtual resources based on the exiting.

14. The computer system of claim 8, further comprising prior to the initiating reassignment of the hardware memory segments, storing the data of the virtual machine in the hardware memory segments, wherein the stored data of the virtual machine stored in the hardware memory segments comprises all data of the virtual machine stored in a set of all hardware memory segments mapped to the source virtual machine monitor and the hardware memory segments storing the data of the virtual machine contain data of only the virtual machine and no other virtual machines.

15. A computer program product comprising:
   a non-transitory computer readable storage medium storing instructions for execution to perform a method comprising:
      migrating a virtual machine from a source virtual machine monitor to a destination virtual machine monitor, the migrating comprising:
         obtaining configuration information indicating hardware memory segments mapped to the source virtual machine monitor, the hardware memory segments storing data of the virtual machine; and
         initiating reassignment of the hardware memory segments to map the hardware memory segments to the destination virtual machine monitor, wherein contents of the hardware memory segments remain intact.

16. The computer program product of claim 15, wherein the hardware memory segments are initially assigned to a source logical partition in which the source virtual machine monitor operates, and wherein initiating the reassignment of the hardware memory segments initiates reassignment of the hardware memory segments to a destination logical partition in which the destination virtual machine monitor operates.

17. The computer program product of claim 15, wherein the migrating further comprises transferring the configuration information from the source virtual machine monitor to the destination virtual machine monitor to facilitate creation of the virtual machine in the destination virtual machine monitor.

18. The computer program product of claim 17, wherein the migrating further comprises suspending execution of the virtual machine and obtaining the configuration information based on the suspending execution.

19. The computer program product of claim 18, wherein subsequent to the suspending, virtual resources used for execution of the virtual machine initially remain allocated for execution of the virtual machine, and wherein the migrating further comprises:
   exiting the virtual machine in the source virtual machine monitor based on the initiating reassignment of the hardware memory segments; and
   freeing the virtual resources based on the exiting.

20. The method of claim 1, wherein the source virtual machine monitor and destination virtual machine monitor are virtual machine monitors of a single computer system.

* * * * *